(12) United States Patent
Ho et al.

(10) Patent No.: US 12,373,887 B2
(45) Date of Patent: *Jul. 29, 2025

(54) SYSTEMS AND METHODS FOR COLLATERAL DEPOSIT IDENTIFICATION

(71) Applicant: Wells Fargo Bank, N.A., San Francisco, CA (US)

(72) Inventors: Peter Ho, Walnut Creek, CA (US); Robin Lo, San Francisco, CA (US); Lisa M. Schur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,847

(22) Filed: Feb. 12, 2024

(65) Prior Publication Data
US 2024/0185337 A1 Jun. 6, 2024

Related U.S. Application Data

(63) Continuation of application No. 17/346,906, filed on Jun. 14, 2021, now Pat. No. 11,900,452, which is a
(Continued)

(51) Int. Cl.
*G06Q 40/00* (2023.01)
*G06Q 20/24* (2012.01)
(Continued)

(52) U.S. Cl.
CPC ............ *G06Q 40/03* (2023.01); *G06Q 20/24* (2013.01); *G06Q 20/3226* (2013.01); *G06Q 20/4014* (2013.01)

(58) Field of Classification Search
None
See application file for complete search history.

(56) References Cited

U.S. PATENT DOCUMENTS

| 5,724,523 A | 3/1998 | Longfield |
| 8,676,708 B1 | 3/2014 | Honey |

(Continued)

FOREIGN PATENT DOCUMENTS

| AU | 2012200424 A1 | 8/2012 |
| CN | 104680361 B | 6/2015 |

(Continued)

OTHER PUBLICATIONS

Khan et al. "A compendious study of online payment systems: Past developments, present impact, and future considerations," May 1, 2017; International Journal of Advance Computer Science and Applications; 8(5): 256-71. (Year: 2017).

(Continued)

*Primary Examiner* — Olabode Akintola
(74) *Attorney, Agent, or Firm* — Foley & Lardner LLP (57) ABSTRACT

A secured credit provider computing system is provided. The system includes a network interface configured to communicate data over a network and a processing circuit including one or more processors coupled to non-transitory memory. The processing circuit is configured to receive, from a user computing device, an application for secured credit; generate a passcode corresponding to the application and transmit the passcode to the user computing device; receive the passcode from an automated teller machine (ATM) of a second provider; responsive to identifying the application based on the passcode, transmit, to the ATM for display, a collateral request for the application; receive, from the ATM, a message acknowledging a collateral deposit; determine that the collateral deposit satisfies the collateral request for the identified application; and transmit, to the user computing device or to the ATM, a notification indicating that the application has been approved.

20 Claims, 5 Drawing Sheets

Related U.S. Application Data continuation of application No. 15/796,126, filed on Oct. 27, 2017, now Pat. No. 11,049,180.

(51) Int. Cl.
  *G06Q 20/32* (2012.01)
  *G06Q 20/40* (2012.01)
  *G06Q 40/03* (2023.01)

(56) References Cited

U.S. PATENT DOCUMENTS

| | | |
|---|---|---|
| 10,643,191 B2 | 5/2020 | Jurss |
| 2006/0224480 A1 | 10/2006 | Bent et al. |
| 2006/0248020 A1 | 11/2006 | Robinson |
| 2007/0027799 A1 | 2/2007 | Manelis et al. |
| 2008/0052224 A1 | 2/2008 | Parker |
| 2010/0318461 A1 | 12/2010 | Smith et al. |
| 2013/0073446 A1 | 3/2013 | Lee et al. |
| 2013/0198071 A1* | 8/2013 | Jurss ................ G06Q 20/108 705/42 |
| 2014/0201060 A1* | 7/2014 | Rice .................. G06Q 40/03 705/38 |
| 2015/0115027 A1 | 4/2015 | Carpenter et al. |
| 2015/0269433 A1 | 9/2015 | Amtrup et al. |
| 2015/0278946 A1 | 10/2015 | Don et al. |
| 2015/0339769 A1 | 11/2015 | Deoliveira et al. |
| 2016/0012465 A1* | 1/2016 | Sharp ................. G06Q 20/321 705/14.17 |
| 2017/0085545 A1 | 3/2017 | Lohe et al. |
| 2017/0091756 A1 | 3/2017 | Stern et al. |
| 2017/0091873 A1 | 3/2017 | Cole et al. |
| 2017/0221052 A1 | 8/2017 | Sheng et al. |
| 2019/0164221 A1 | 5/2019 | Hill et al. |
| 2019/0378137 A1 | 12/2019 | Honey et al. |
| 2020/0219073 A1 | 7/2020 | Jurss |
| 2021/0174436 A1 | 6/2021 | Teeven et al. |

FOREIGN PATENT DOCUMENTS

| | | |
|---|---|---|
| WO | WO-2011/150503 A1 | 12/2011 |
| WO | WO-2013/191427 A1 | 12/2013 |
| WO | WO-2017/052415 A1 | 3/2017 |

OTHER PUBLICATIONS

Munjal et al. "Secure and cost effective transaction model for financial services," 2009 International Conference on Ultra Modern Telecommunications & Workshops, St. Petersburg, Russia, 2009, pp. 1-6, (Year: 2009).

* cited by examiner

SYSTEMS AND METHODS FOR COLLATERAL DEPOSIT IDENTIFICATION

CROSS-REFERENCE TO RELATED PATENT APPLICATIONS

This application is a continuation of and claims priority to U.S. patent application Ser. No. 17/346,906 filed Jun. 14, 2021, which is a continuation of and claims priority to U.S. patent application Ser. No. 15/796,126 filed Oct. 27, 2017, the disclosures of which are incorporated herein by reference in their entireties.

BACKGROUND

As a significant portion of consumers have either poor credit or no credit whatsoever, providers of financial services have an incentive to offer credit products tailored to the particular needs of these consumers. One particularly advantageous category of products for these consumers is secured credit products. Secured credit products are arrangements between secured credit providers and consumers in which the consumer must deposit some form of collateral as security for the line of credit. For example, if an applicant wishes to obtain a secured credit card with a credit limit of $500, the applicant must first make a collateral deposit of $500 into an escrow account. The collateral deposited in the escrow account cannot be used to make credit card payments, but upon a certain period of favorable payment history to the credit card, the secured credit card may be upgraded to an unsecured credit card and the collateral in the escrow account may be refunded. Currently, secured credit product applicants that do not have a pre-existing account with the secured credit provider issuing the secured credit product (or that have a pre-existing account with the secured credit provider, but opt to fund the collateral using account(s) from a different provider) generally must submit a collateral deposit check by mail or in person at a branch of the secured credit provider to apply for a secured credit card.

SUMMARY

One embodiment of the disclosure relates to a secured credit provider computing system. The system includes a network interface configured to communicate data over a network and a processing circuit including one or more processors coupled to non-transitory memory. The processing circuit is configured to receive a secured credit application from an applicant, transmit a passcode message to the applicant, receive a confirmation message of collateral deposited into a collateral escrow account from an escrow account provider computing system, and issue a secured credit product to the applicant.

Another embodiment of the present disclosure relates to a computer-implemented method. The method includes receiving a secured credit application from an applicant, transmitting a passcode message to the applicant, receiving a confirmation message of collateral deposited into a collateral escrow account, and issuing a secured credit product to the applicant.

Another embodiment of the present disclosure relates to a computer-implemented method. The method includes transmitting a secured credit product application and receiving a passcode message indicating conditional approval of the secured credit product application. The passcode message includes a passcode configured to enable a secured credit product application to access a collateral deposit tool. The method further includes entering the passcode into the collateral deposit tool, and depositing collateral using the collateral deposit tool, where depositing collateral completes the secured credit product application.

These and other features, together with the organization and manner of operation thereof, will become apparent from the following detailed description when taken in conjunction with the accompanying drawings.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Referring to the figures generally, various systems, methods, and apparatuses related to a secured card collateral capture system structured to assist applicants for secured credit products are described. As used herein, an "applicant" may refer to either an individual or a business seeking to obtain a secured credit product. Secured credit products may include, but are not limited to, secured credit cards, secured lines of credit, and secured loans. As described in further detail below and according to the methods and systems disclosed herein, the applicant may submit the collateral used to secure the credit product via a collateral deposit tool. In some arrangements, use of the collateral deposit tool involves a deposit of checks and/or cash into an automated teller machine (ATM). In other arrangements, use of the collateral deposit tool involves a check image captured by a remote deposit capture application installed on a computing device.

Under existing methods, when a check is deposited by the applicant as a collateral for a secured credit product, it is generally mailed to either an escrow account provider or to the secured credit provider. Once received at its destination, the deposit check must be identified as originating from a particular applicant and associated with the applicant's account, either via manual or automatic methods. As described in further detail below, the invention of the present disclosure represents a technical improvement over existing methods because no identification or association activities need be performed by the check recipient. Instead, because the applicant must enter a passcode prior to capturing an image of the deposit check via a smartphone application or via an ATM, the check image is transmitted electronically with data that permits the applicant to be immediately identified and the correct account credited with the deposit. This results in the issuance of the secured credit product with fewer required CPU cycles performed by the escrow account provider computing system and/or the secured credit provider computing system.

Figure 1:
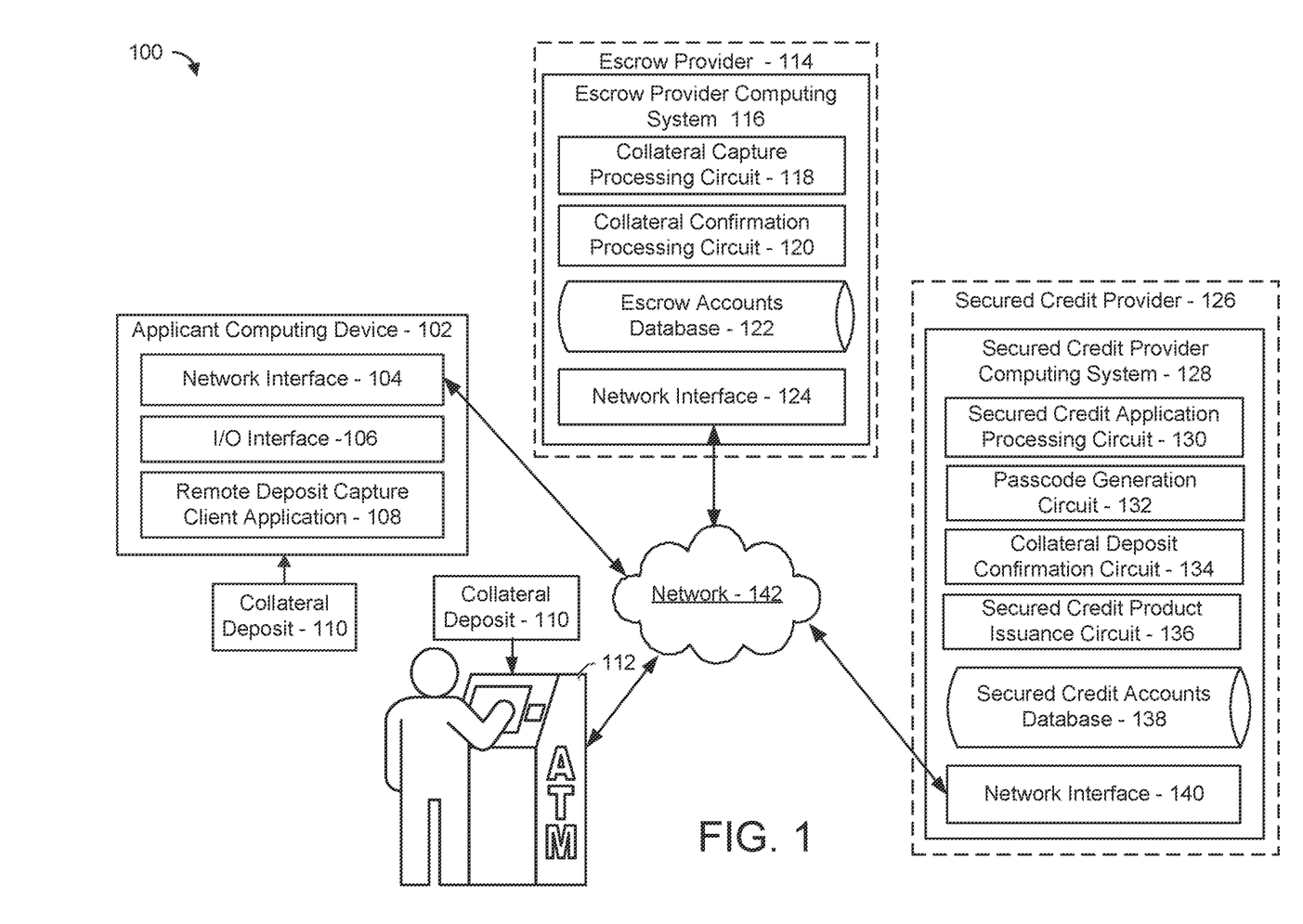
FIG. 1 is a schematic diagram of a computer-implemented secured card collateral capture system, according to an example embodiment.

Referring now to FIG. 1, a block diagram of a secured credit collateral capture system 100 is shown, according to an example embodiment. The capture system 100 includes an applicant computing device 102, an ATM 112, an escrow provider computing system 116 operated by an escrow provider 114, and a secured credit provider computing system 128 operated by a secured credit provider 126. Various components of the capture system 100 communicate with one another over a network 142. The network 142 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 142 includes the internet.

The applicant computing device 102 is a computing device associated with an applicant of a secured credit product. The applicant computing device 102 includes any type of computing device capable of receiving and transmitting information related to a secured credit application over the network 142. The applicant computing device 102 includes both wearable and non-wearable devices. Wearable devices refer to any type of device that an individual wears including, but not limited to, a watch (e.g., smart watch), glasses (e.g., eye glasses, sunglasses, smart glasses), bracelet (e.g., a smart bracelet), etc. The applicant computing device 102 also includes any type of non-wearable device including, but not limited to, a phone (e.g., a smartphone, etc.), a tablet, and a personal digital assistant.

In the example arrangement shown, the applicant computing device 102 includes a network interface 104 enabling the applicant computing device 102 to exchange information over the network 142, a remote deposit capture client application 108, and an input/output (I/O) interface 106. The I/O interface 106 includes hardware and associated logics configured to enable the applicant computing device 102 to exchange information with the applicant, the escrow provider computing system 116, and the secured credit provider computing system 128, as will be described in greater detail below. An input device or component of the I/O interface 106 allows the applicant to provide information to the applicant computing device 102, and may include, for example, a mechanical keyboard, a touchscreen, a microphone, a camera, a fingerprint scanner, any user input device engageable with the applicant computing device 102 via a universal serial bus (USB) cable, serial cable, Ethernet cable, and so on. An output device or component of the I/O interface 106 allows the applicant to receive information from the applicant computing device 102, and may include, for example, a digital display, a speaker, illuminating icons, light emitting diodes (LEDs) and the like.

The capture client application 108 is structured to assist the applicant in capturing an image of a check used as a collateral deposit 110 for the secured credit product. Accordingly, the capture client application 108 is communicably and operatively coupled to the I/O interface 106 to receive images captured by the I/O interface 106. For example, a user captures an image of a check using a camera on the applicant computing device 102. The captured image is communicated to the capture client application 108. The capture client application 108 is configured to transmit that captured image to the computing system 116 and/or the computing system 128. In some arrangements, an applicant may be prompted to enter additional information to supplement the captured image including, but not limited to, the applicant's name, the deposit amount, the check number, and the routing number. In other arrangements, all check data is automatically captured via the capture client application 108.

In some arrangements, the capture client application 108 is a separate software application implemented on the applicant computing device 102. The capture client application 108 may be downloaded by the applicant computing device 102 prior to its usage, hard coded into the memory of the applicant computing device 102, or accessible as a web-based interface application such that the applicant accesses the capture client application 108 via a web browsing application. In this latter instance, the capture client application 108 may be supported by a separate computing system including one or more servers, processors, network interface circuits, etc., that transmit applications for user to the applicant computing device 102. In certain arrangements, the capture client application 108 includes an application programming interface (API) and/or a software development kit (SDK) that facilitates the integration of other applications.

Irrespective of the form that the capture client application 108 takes, the capture client application 108 is structured to transmit and receive data (e.g., check images of the deposit 110) from the escrow provider 114 and the secured credit provider 126 via the network 142. Further details of these interactions are provided below with reference to FIGS. 2 and 4. In various arrangements, the capture client application 108 is also configured to provide displays to the applicant computing device 102 that assist the applicant in capturing an image of a check comprising the deposit 110. For example, a notification indicating successful capture of the check image may be generated and presented to the applicant upon completion of the image capture.

Still referring to FIG. 1, the ATM 112 is capable of both receiving deposits and dispensing funds. For example, the ATM 112 may be used to perform functions such as withdrawals of paper currency, deposits of paper currency and checks, and monitoring of account balances. In one arrangement, the ATM 112 is owned and operated by the secured credit provider 126. In another arrangement, the ATM 112 is owned and operated by the escrow provider 114. In other arrangements, the ATM 112 is owned and operated by a different banking institution.

The ATM 112 includes a transaction slot configured to receive deposits of paper currency and checks (e.g., the deposit 110). The ATM 112 may further include a keypad, or similar user input device, containing a number of buttons (e.g., alphanumeric) configured to receive input (e.g., a passcode, described in further detail below) from an applicant. Additionally or alternatively, the ATM 112 may incorporate similar user input devices such as touch screens, gesture recognition, and so on. The applicant utilizes the user input devices, such as the keypad, to navigate a graphical user interface (GUI) of the ATM 112. The GUI allows the user to perform the various functions of the ATM 112 and also display information (e.g., prompts, images, text) to the applicant. For example, the GUI of the ATM 112 may display information related to the collateral deposit (e.g., the required deposit amount) to the applicant.

The capture system 100 is further shown to include an escrow provider computing system 116. The computing system 116 is associated with an escrow provider 114. As used herein, the escrow provider 114 is a banking institution or other entity that administers accounts that are used to store collateral for a secured credit product. In some arrangements, the escrow provider 114 and the secured credit provider 126 are the same entity or have some affiliation with each other (e.g., the escrow provider 114 is a subsidiary of the secured credit provider 126 or vice versa). In other arrangements, the escrow provider 114 and the secured credit provider 126 are wholly independent entities.

The computing system 116 includes a network interface 124 that enables the computing system 116 to communicate data over the network 142 and between a collateral capture processing circuit 118, a collateral confirmation processing circuit 120, and an escrow accounts database 122. The capture processing circuit 118 and the confirmation processing circuit 120 may consist of one or more processors coupled to memory. Each processor may be implemented as one or more application specific integrated circuits (ASICs), field programmable gate arrays (FPGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory is communicably coupled to the processor and includes computer code or instructions for executing one or more processes described herein.

The capture processing circuit 118 is configured to receive the deposit 110 from a capture tool (e.g., the capture client application 108, the ATM 112) and deposit into an account in the database 122. As such, the capture processing circuit 118 is communicatively and operatively coupled to the capture client application 108 and the ATM 112. In various arrangements, the deposit 110 is in the form of cash or a check image. For example, an applicant captures a check image on the applicant computing device 102 using the capture application 108 for further processing. As another example, the applicant approaches the ATM 112 and upon receiving a prompt from the ATM 112, deposits cash or checks into the transaction slot. Upon receiving the deposit, the ATM 112 transmits a notification to the capture processing circuit 118.

The confirmation processing circuit 120 is configured to generate and transmit messages to the computing system 128 regarding the status of collateral deposited into the database 122. In some arrangements, the confirmation processing circuit 120 transmits a confirmation message to the computing system 128 including the collateral status based on data stored in the database 122. In various arrangements, the collateral status includes, but is not limited to, the identity of the applicant, the amount of collateral deposited, and a timestamp of when the collateral was deposited.

The database 122 is a storage device structured to retrievably store data pertaining to collateral deposited by secured credit applicants. In various arrangements, the database 122 stores data according to instructions generated by the capture processing circuit 118. This data may include, but is not limited to, the collateral deposit balance, a timestamp indicating when the collateral was deposited, and applicant identifying information (e.g., the applicant's name, address, phone number). In some arrangements, the data stored in the database 122 is accessible to the applicant and the computing system 128. For example, in one arrangement, via the computing system 128, the secured credit provider 126 may request confirmation of the collateral deposit balance from the computing system 116 before issuing the secured credit product to the applicant. As described above, upon receipt of the request confirmation, the confirmation processing circuit 120 transmits a confirmation message including information from the database 122. In response to the request, the confirmation processing circuit 120 may transmit a confirmation message to the computing system 128 containing data stored in the escrow accounts database 122.

The computing system 128 is a computing system associated with an entity, the secured credit provider 126, that issues and provides administration of secured credit products. In an example arrangement, the secured credit provider 126 is a banking entity. Secured credit products may include, but are not limited to, secured credit cards, secured lines of credit, and secured loans. The computing system 128 includes, among other systems, a secured credit provider network interface 140, a secured credit application processing circuit 130, a passcode generation circuit 132, a collateral deposit confirmation circuit 134, a secured credit product issuance circuit 136, and a secured credit accounts database 138. The network interface 140 enables the computing system 128 to exchange information over the network 142.

The application processing circuit 130, the passcode generation circuit 132, the confirmation circuit 134, and the issuance circuit 136 may consist of one or more processors coupled to memory. Each processor may be implemented as one or more application specific integrated circuits (ASICs), field programmable gate arrays (FPGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory is communicably coupled to the processor and includes computer code or instructions for executing one or more processes described herein.

The application processing circuit 130 is configured to manage transactions between the applicant and the secured credit provider 126. The application processing circuit 130 receives and processes applications received from applicants in various formats (e.g., via a website, by phone, in person). In various arrangements, the application processing circuit 130 additionally stores and applies rules regarding the conditional approval of applications. For example, rules regarding the conditional approval of applications may involve a verification of the applicant's identity (e.g., to prevent fraudsters from obtaining secured credit products) and a determination of the ratio between the required collateral deposit and the credit limit of the secured credit product (e.g., for many individual applicants, the collateral deposit will be equal to the credit limit; for business applicants, the collateral deposit may be lower than the credit limit).

The passcode generation circuit 132 is configured to manage transactions between the applicant and the secured credit provider 126. In various arrangements, the passcode generation circuit 132 is configured to generate a one-time passcode that is entered by the applicant into either a smartphone application (e.g., the capture client application 108) or an ATM (e.g., the ATM 112) to complete deposit of the collateral. The one-time passcode may be an alphanumeric string (e.g., "123ABC"). For data security reasons, the one-time passcode is configured for a single use by the applicant. In addition, the one-time passcode may expire after a certain period regardless of whether it has been used by the applicant. In various arrangements, the passcode generation circuit 132 is also configured to transmit a passcode message to the applicant that contains the one-time passcode. The passcode message may be transmitted by email, by phone, by text message, or by in-application messaging (e.g., a push notification). In some arrangements, the passcode message also includes the required collateral deposit amount determined by the application processing circuit 130.

The confirmation circuit 134 is configured to manage transactions between the remote deposit capture tool (e.g., the capture client application 108, the ATM 112), the escrow provider 114, and the secured credit provider 126. In some arrangements, the confirmation circuit 134 transmits messages to and receives messages from the confirmation processing circuit 120 regarding the status of collateral held by the escrow provider 114. For example, the status of the collateral held by the escrow provider 114 may include both the amount of collateral and a timestamp of when it was received by the escrow provider 114. In some arrangements, the confirmation circuit 134 receives messages from the capture client application 108 and/or the ATM 112 when the applicant deposits collateral. Receipt of a message from the capture client application 108 and/or the ATM 112 may prompt the confirmation circuit 134 to transmit a message to the computing system 116 regarding the collateral status.

The issuance circuit 136 is configured to manage transactions between the applicant and the secured credit provider 126. In some arrangements, the issuance circuit 136 stores and applies rules involving the issuance of the secured credit product. Rules involving the issuance may include the type of collateral deposit confirmation required before the product is issued (e.g., whether a confirmation message from the escrow account provider is required, or whether receipt of a collateral deposit check image is sufficient), and a determination of the period in which the applicant must hold the secured credit product before being considered for an upgrade to an unsecured credit product. The issuance circuit 136 issues the secured credit product, which includes generating an account number related to the secured credit product. In some arrangements, the issuance circuit 136 is configured to transmit a message to the applicant to notify the applicant of the issuance. For example, the issuance circuit 136 may transmit a notification message to the applicant via email, text message, or in-application messaging (e.g., a push notification). In still further arrangements, the issuance circuit 136 is also configured to provision an issued secured credit card to the applicant's mobile wallet account. Provisioning an issued secured credit card to the applicant's mobile wallet account includes provisioning a token to the mobile wallet that is related to the account. Provisioning the secured credit card to the applicant's mobile wallet account may be advantageous because it permits the applicant to begin using the secured credit card before the applicant receives the physical credit card.

The database 138 is a storage device structured to retrievably store data pertaining to the secured credit product issued by the secured credit provider 126. This data may include, but is not limited to, the type of secured credit product (e.g., secured credit card, secured line of credit, secured loan), the collateral deposit amount, the secured credit limit, the secured credit product payment history, a timestamp for the creation of the secured credit product account, and applicant identifying data. In various arrangements, applicant identifying data may include the applicant's name, address, phone number, occupation, and income level.

Figure 2:
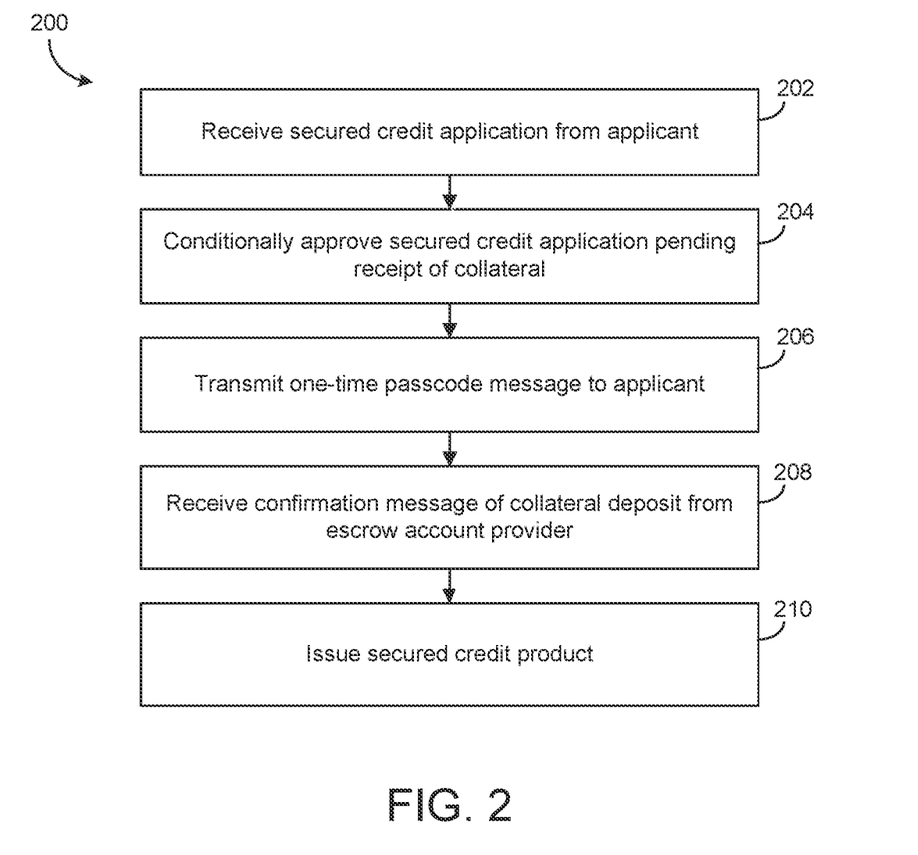
FIG. 2 is a schematic diagram of a computer-implemented process for issuing a secured credit product, according to an example embodiment.

Turning now to FIG. 2, a flow diagram of a method 200 for issuing a secured credit product is depicted. In some arrangements, the method 200 is performed using the capture system 100 shown in FIG. 1. In particular, the method 200 may be at least partially performed by the computing system 128. A secured credit application is received from the applicant at 202. In various arrangements, the application is received by the application processing circuit 130 via a website or phone number operated or associated with the secured credit provider 126. In other arrangements, the application is received by the application processing circuit 130 via an in-person application at a physical branch of the secured credit provider 126.

The application is conditionally approved pending receipt of collateral at 204. In some arrangements, the application processing circuit 130 applies stored rules to the application to determine whether to conditionally approve the application. For example, the rules for conditional approval of an application may include consideration of the applicant's credit score, financial history with the secured credit provider 126, and income level or projected earnings, as well as the requested credit amount. In various arrangements, when the application is conditionally approved, the application processing circuit 130 applies additional stored rules to determine the available credit amount, the collateral deposit required, and when applicable, the minimum period before a secured credit product may be upgraded to an unsecured credit product. In many arrangements, the collateral deposit required is equal to the available secured credit. For example, the applicant is required to make a collateral deposit of $500 in order to obtain a credit card with a credit limit of $500. In other arrangements, for example, when the applicant is a new business with limited credit history, the collateral deposit may be smaller than the available secured credit.

A one-time passcode message is transmitted to the applicant at 206. Generation and transmission of the passcode is completed by the passcode generation circuit 132. In various arrangements and described in further detail below, the one-time passcode is entered by the applicant into either a smartphone application (e.g., the capture client application 108) or an ATM (e.g., the ATM 112) in order to deposit collateral. For data security reasons, the one-time passcode is configured for a single use by the applicant. In addition, the one-time passcode may expire after a certain period regardless of whether it has been used by the applicant. In some arrangements, the passcode message also includes the required collateral deposit amount determined by the application processing circuit 130. A message confirming the receipt of the collateral deposit is received at 208. In various arrangements, the confirmation message is received and analyzed by the confirmation circuit 134. For example, the confirmation circuit 134 is configured to verify that the amount of the collateral deposit as communicated by the escrow provider 114 is the same as the amount of required collateral determined by the application processing circuit 130. In some arrangements, the confirmation message received by the confirmation circuit 134 is generated by the confirmation processing circuit 120 of the computing system 116.

The secured credit product is issued at 210. In various arrangements, issuance of the product by the issuance circuit 136 includes the creation of a secured credit account associated with the applicant in an accounts database (e.g., the database 138). If the product is a secured credit card, issuance of the card includes assigning a credit card number to the applicant and associating the credit card number with the secured credit account in the accounts database. In some arrangements, issuance of the product also includes transmitting a message to the applicant to notify the applicant of the issuance. For example, the issuance circuit 136 transmits a notification message to the applicant via email, text message, or in-application messaging (e.g., a push notification).

Figure 3:
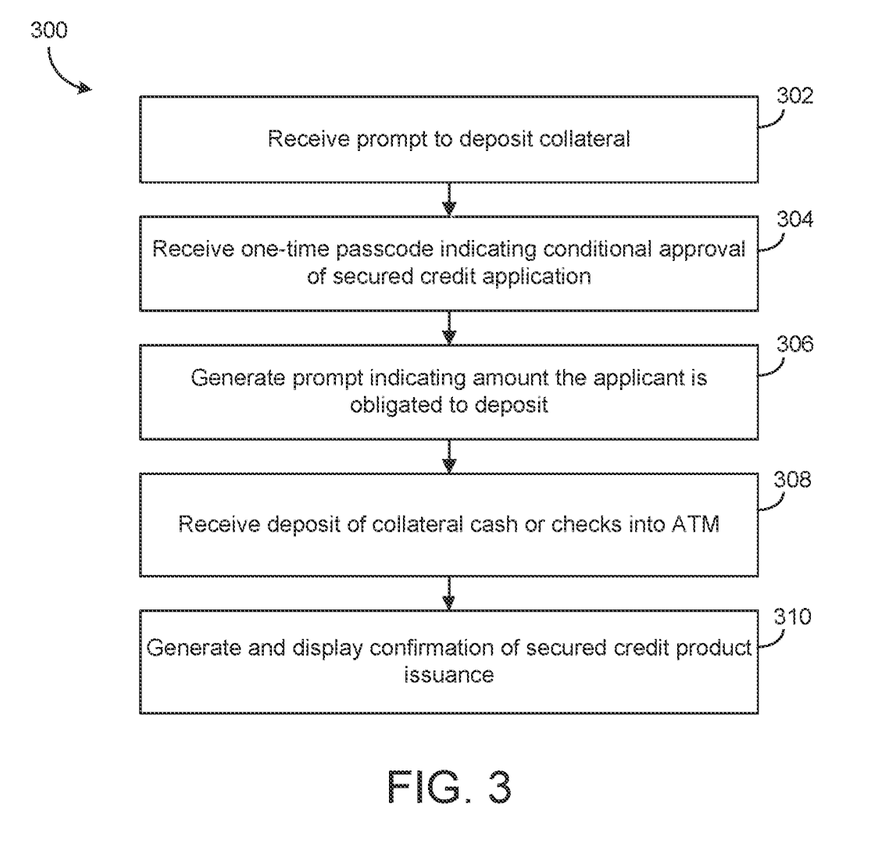
FIG. 3 is a schematic diagram of a computer-implemented process for depositing collateral for a secured credit product using a collateral deposit tool, according to an example embodiment.

Referring now to FIG. 3, a flow diagram of a method 300 for depositing collateral for a secured credit product is shown according to an example embodiment. In some arrangements, the method 300 is performed using the capture system 100 shown in FIG. 1. In particular, the method 300 is at least partially performed by ATM 112. A prompt to deposit collateral is received at 302. For example, the prompt to deposit collateral is received at the ATM 112 when the applicant selects a "Deposit Collateral" menu option at the ATM 112. In various arrangements, the ATM 112 receives the prompt to deposit collateral after the applicant for the secured credit product completes the application via a website submission, using the applicant computing device 102, a phone call, or an in-person submission at a branch of the secured credit provider 126 and receives conditional approval of the application via a notification message transmitted by the secured credit provider computing system 128.

A one-time passcode indicating the conditional approval is received at 304. For example, the conditional approval is received by the ATM 112 as a one-time passcode entered by the applicant. In various arrangements, the passcode is an alphanumeric string of any length sufficient to verify the identity of the applicant (e.g., 6-10 characters long). In some arrangements, the passcode is transmitted to the ATM 112 from the applicant computing device 102 using near-field communication (NFC), Bluetooth®, ZigBee®, RFID, electronic messaging, etc. In other arrangements, the applicant enters other identifying information in addition to or in place of the one-time passcode in order to authenticate the applicant's identity. For example, this identifying information may include biometric data (e.g., fingerprint, voiceprint) or security question answers. In various arrangements, entry of the one-time passcode is a completely card-less transaction, and the applicant requires no pre-existing relationship with the entity operating the ATM (e.g., the secured credit provider 126) in order to initiate the collateral deposit.

A prompt indicating the amount the applicant is obligated to deposit is generated at 306. In various arrangements, the required collateral amount is determined by the application processing circuit 130 and is received by the ATM 112 subsequent the applicant's entry of the one-time passcode into the ATM 112.

Cash or checks constituting the collateral (e.g., the deposit 110) for the secured credit product are received by at 308. Deposit of the collateral into the ATM 112 represents the completion of the application. In some arrangements, the ATM 112 is configured to transmit a message to the computing system 116 and/or the computing system 128 acknowledging the collateral deposit.

A confirmation of the secured product issuance is generated and displayed at 310. In some arrangements, the confirmation is generated and displayed by the ATM 112 upon receipt of a message from the issuance circuit 136 of the computing system 128. For example, the ATM 112 may display a message to the applicant such as "Your collateral has been successfully deposited and your secured credit card has been issued."

Figure 4:
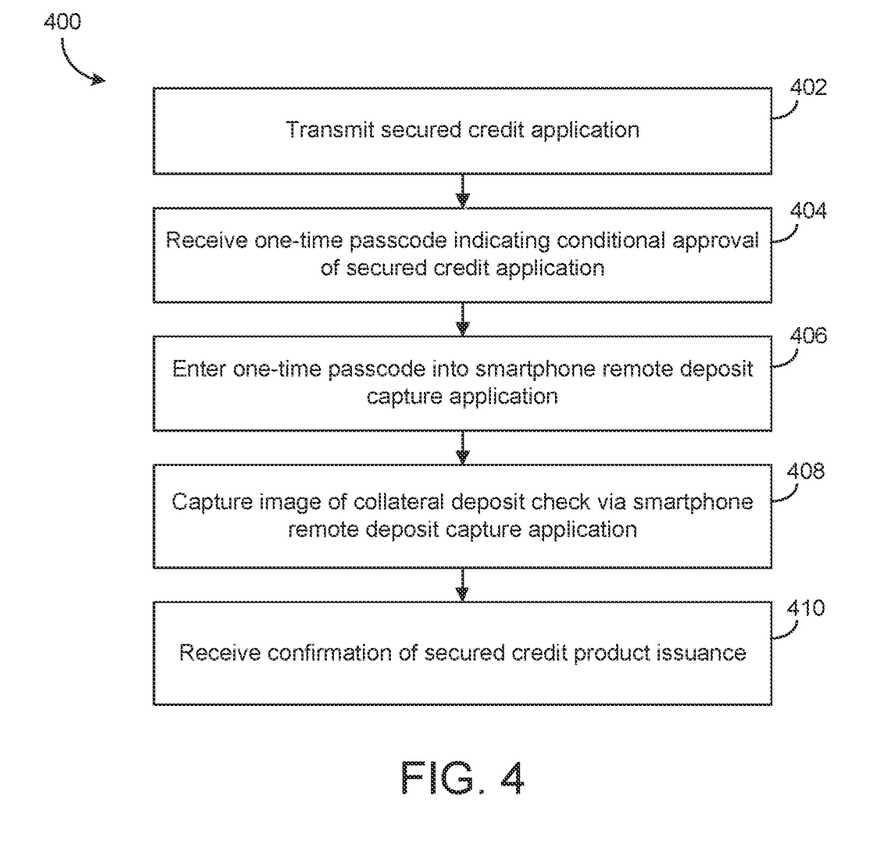
FIG. 4 is schematic diagram of another computer-implemented process for depositing collateral for a secured credit product using a collateral deposit tool, according to an example embodiment.

Referring now to FIG. 4, a flow diagram of another method 400 for depositing collateral for a secured credit product is shown according to an example embodiment. In some arrangements, the method 400 is performed using the capture system 100 shown in FIG. 1. In particular, the method 400 is at least partially performed by the capture client application 108 of the applicant computing device 102. The application is transmitted at 402. In some arrangements, as described above, the applicant completes the secured credit product application via a website, phone call, or in-person submission. In other arrangements, the applicant accesses and submits the secured credit card via a user interface provided by the capture client application 108.

In response to a conditional approval of the application, a one-time passcode indicating the conditional approval is received at 404. In various arrangements, the applicant receives the one-time passcode via email, text message, or in-application messaging (e.g., a push notification). In some arrangements, the passcode is an alphanumeric string of any length sufficient to verify the identity of the applicant (e.g., 6-10 characters long). The passcode message may also contain the required collateral deposit amount and a proposed credit limit for the secured credit product.

The one-time passcode is entered into the capture client application (e.g., the capture client application 108 of the applicant computing device 102) at 406. For example, the applicant may enter the passcode in the capture client application 108 via the I/O interface 106 (e.g., a keypad). An image of the collateral deposit check is captured by the capture client application at 408. For example, the capture client application may prompt the applicant to take a picture of the deposit 110 by activating an I/O interface 106 (e.g., a camera) of the applicant computing device 102. Capture of the collateral of the collateral check image by the capture client application 108 represents the completion of the secured credit product application.

Confirmation of the issuance of the product is received at 410. As described above, in various arrangements, issuance of the product includes receipt of a message from the secured credit provider 126. For example, the issuance circuit 136 transmits a notification message to the applicant via email, text message, or in-application messaging (e.g., a push notification). In some arrangements, if the applicant has a mobile wallet account, issuance of a secured credit card includes provisioning the secured credit card to the applicant's mobile wallet account. In various arrangements, the applicant's mobile wallet account is accessible via an application provided by the secured credit provider 126 and installed on the applicant computing device 102. In some arrangements, the capture client application 108 is a subcomponent of the same application.

Figure 5:
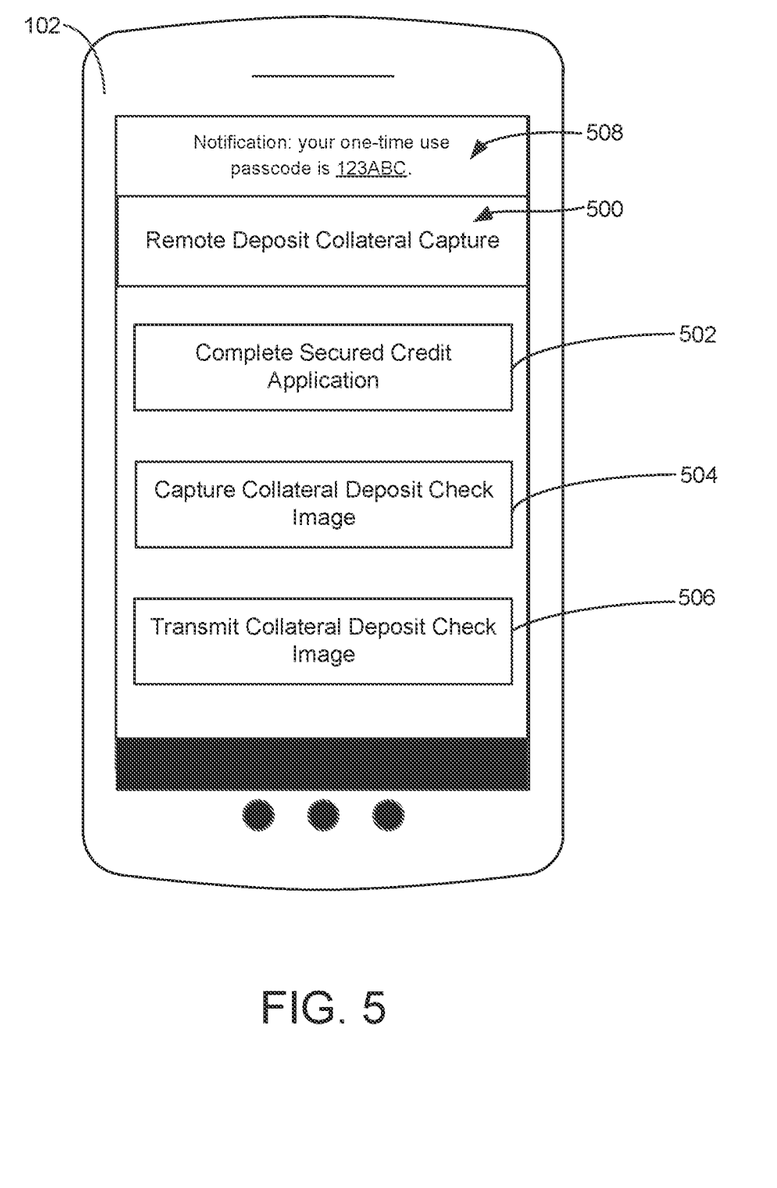
FIG. 5 is a schematic diagram of a remote deposit capture client application user interface, according to an example embodiment.

Referring now to FIG. 5, a remote deposit collateral capture user interface 500 is shown, according to an example embodiment. While the interface 500 is shown to be presented to the applicant via the applicant computing device 102 (e.g., a mobile device, a tablet), it should be understood that a similar interface may also be accessible to a user as a cloud service via any suitable internet browser. The interface 500 may be presented to the user during the capture processes described in methods 300 and 400 above. In the example shown, the interface 500 includes a complete secured credit application button 502, a capture collateral deposit check image button 504, and a transmit collateral deposit check image button 506. In some arrangements, each of the buttons 502-506 comprises a hyperlink and clicking on the hyperlink opens an entry-specific window.

The complete application button 502 opens an entry-specific window that permits the applicant to complete and transmit an application to the secured credit provider 126. For example, the entry-specific window may prompt the applicant to enter personal information including, but not limited to, name, address, phone number, email address, social security number, and credit limit requested. The capture check image button 504 opens an entry-specific window that permits the applicant to take a picture of a personal check. The capture check image button 504 may open a camera application of the applicant computing device 102 to allow the applicant to capture the check image. The transmit check image button 506 opens an entry-specific window that permits the applicant to transmit the check image to the escrow provider 114 and/or the secured credit provider 126.

The user interface 500 is further shown to include a notification banner 508. The notification banner 508 may notify the applicant of the one-time passcode generated by the passcode generation circuit 132 that the applicant must enter into either the remote deposit capture client application 108 or the ATM 112 in order to deposit collateral. In various arrangements, the notification banner 508 may also indicate the required collateral deposit amount the applicant must submit in order to complete the secured credit product application. For example, the notification banner 508 may display the following message: "Your required collateral deposit is $500. Your one-time passcode is 1234ABCD."

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system, comprising:
   a network interface configured to communicate data over a network; and
   a processing circuit comprising one or more processors coupled to a non-transitory memory, wherein the processing circuit is configured to:
   receive, from a user computing device, via a website or software application running on the user computing device, a first request for a secured credit product;
   generate a passcode corresponding to the first request, the passcode having an expiration determined based on the first request;
   transmit the passcode to the user computing device;
   receive a second request corresponding to the secured credit product from an automated teller machine (ATM), the second request comprising the passcode;
   responsive to identifying the first request for the secured credit product based on the passcode and determining that the passcode is active based on the expiration, cause the ATM to display a graphical user interface including an element that, when interacted with, causes the ATM to accept a check or paper currency corresponding to a collateral deposit;
   receive, from the ATM, a message acknowledging the collateral deposit, the message generated by the ATM responsive to the ATM accepting the check or paper currency corresponding to the collateral deposit;
   determine that the collateral deposit satisfies a collateral request for the secured credit product; and
   transmit, to the user computing device or to the ATM, a notification indicating that the first request has been approved.

2. The computing system of claim 1, wherein the message acknowledging the collateral deposit indicates that the check or paper currency was deposited at the ATM.

3. The computing system of claim 1, wherein the passcode is received by the ATM from the user computing device via near-field communication or RFID.

4. The computing system of claim 1, wherein transmitting the passcode comprises transmitting an email to an email address associated with the first request.

5. The computing system of claim 1, wherein transmitting the passcode comprises transmitting a text message to a mobile phone associated with the first request.

6. The computing system of claim 1, wherein the passcode is provided as an in-application message by the software application installed on a smartphone associated with the first request.

7. The computing system of claim 1, wherein the passcode comprises an alphanumeric string.

8. The computing system of claim 1, wherein the secured credit product is at least one of a secured credit card, a secured line of credit, or a secured loan.

9. The computing system of claim 1, wherein the first request is for secured credit for a requested amount, and wherein the processing circuit is further configured to determine a security amount satisfying a predetermined ratio with the requested amount.

10. The computing system of claim 9, wherein determining that the collateral deposit satisfies the collateral request for the secured credit product comprises determining that the collateral deposit corresponds to the security amount.

11. The computing system of claim 1, wherein the processing circuit is further configured to issue the secured credit product responsive to determining that the collateral deposit satisfies the collateral request.

12. The computing system of claim 11, wherein issuing the secured credit product comprises provisioning a secured credit card to a mobile wallet account.

13. The computing system of claim 11, wherein issuing the secured credit comprises generating an account number associated with the secured credit.

14. A computer-implemented method comprising:
   receiving, by a computing system, from a user computing device, via a website or software application running on the user computing device, a first request to apply for a secured credit product;

generating, by the computing system, a passcode corresponding to the first request, the passcode having an expiration determined based on the first request;

transmitting, by the computing system, the passcode to the user computing device;

receiving, by the computing system, a second request to complete the first request to apply for the secured credit from an automated teller machine (ATM), the second request comprising the passcode;

responsive to identifying the first request based on the passcode and determining that the passcode is active based on the expiration, cause the ATM to display a graphical user interface including an element that, when interacted with, causes the ATM to accept a check or paper currency corresponding to a collateral deposit;

receiving from the ATM, by the computing system, a message acknowledging the collateral deposit, the message generated by the ATM responsive to the ATM-accepting the check or paper currency corresponding to the collateral deposit;

determining, by the computing system, that the collateral deposit satisfies a collateral request for the secured credit product; and transmitting, by the computing system, to the user computing device or to the ATM, a notification indicating that the first request has been approved.

15. The computer-implemented method of claim 14, wherein the message acknowledging the collateral deposit indicates that the check or paper currency was deposited at the ATM.

16. The computer-implemented method of claim 14, wherein the passcode is received by the ATM from the user computing device via near-field communication or RFID.

17. The computer-implemented method of claim 14, wherein transmitting the passcode comprises at least one of transmitting an email to an email address associated with the first request or transmitting a text message to a mobile phone associated with the first request.

18. The computer-implemented method of claim 14, wherein the passcode is presented as an in-application message via an application installed on a smartphone associated with the first request.

19. The computer-implemented method of claim 14, wherein the first request is for secured credit for a requested amount, and wherein the method further comprises determining a security amount satisfying a predetermined ratio with the requested amount.

20. The computer-implemented method of claim 19, wherein determining that the collateral deposit satisfies the collateral request for the secured credit product comprises determining that the collateral deposit corresponds to the security amount.

* * * * *